United States Patent
Edpalm et al.

(10) Patent No.: US 12,100,213 B2
(45) Date of Patent: Sep. 24, 2024

(54) ALERT GENERATION BASED ON EVENT DETECTION IN A VIDEO FEED

(71) Applicant: Axis AB, Lund (SE)

(72) Inventors: Viktor Edpalm, Lund (SE); Song Yuan, Lund (SE); Adnan Saleem, Lund (SE); Rodrigo Such, Lund (SE)

(73) Assignee: Axis AB, Lund (SE)

( * ) Notice: Subject to any disclaimer, the term of this patent is extended or adjusted under 35 U.S.C. 154(b) by 124 days.

(21) Appl. No.: 17/501,126

(22) Filed: Oct. 14, 2021

(65) Prior Publication Data

US 2022/0129680 A1 Apr. 28, 2022

(30) Foreign Application Priority Data

Oct. 23, 2020 (EP) .................................... 20203602

(51) Int. Cl.
| | |
|---|---|
| G06V 20/52 | (2022.01) |
| G08B 5/22 | (2006.01) |
| H04N 7/18 | (2006.01) |
| H04N 9/64 | (2023.01) |

(52) U.S. Cl.
CPC ............. *G06V 20/52* (2022.01); *G08B 5/22* (2013.01); *H04N 7/183* (2013.01); *H04N 9/646* (2013.01)

(58) Field of Classification Search
CPC .... G06V 20/52; G08B 5/22; G08B 13/19663; H04N 7/183; H04N 9/646
USPC .......................................................... 348/29
See application file for complete search history.

(56) References Cited

U.S. PATENT DOCUMENTS

| | | | | |
|---|---|---|---|---|
| 7,006,666 | B2* | 2/2006 | Montgomery ... | G08B 13/19686 348/E7.086 |
| 8,577,082 | B2* | 11/2013 | Thorpe ............. | G08B 13/19615 382/209 |
| 9,405,005 | B1* | 8/2016 | Arteaga ............... | G08G 5/0021 |
| 9,892,606 | B2 | 2/2018 | Venetianer et al. | |
| 10,192,415 | B2* | 1/2019 | Heitz, III ......... | G08B 13/19656 |
| 10,645,350 | B2* | 5/2020 | Titus ................ | G08B 13/19656 |
| 10,657,382 | B2* | 5/2020 | Chaudhry .............. | G06V 10/62 |
| 10,957,171 | B2* | 3/2021 | Heitz, III ................ | H04N 5/76 |
| 11,238,290 | B2* | 2/2022 | Burns .................... | G06V 20/41 |
| 2003/0122667 | A1* | 7/2003 | Flynn ............... | G08B 13/19689 340/572.1 |

(Continued)

FOREIGN PATENT DOCUMENTS

| | | |
|---|---|---|
| CN | 110602447 A | 12/2019 |
| WO | 2005/041580 A1 | 5/2005 |

(Continued)

OTHER PUBLICATIONS

Extended European Search Report dated Mar. 15, 2021 for European Patent Application No. 20203602.6.

*Primary Examiner* — Behrooz M Senfi
*Assistant Examiner* — Asmamaw G Tarko
(74) *Attorney, Agent, or Firm* — Volpe Koenig

(57) ABSTRACT

Methods, systems and computer program products, for processing a stream of image frames captured by a camera system. A hardcoded alert image frame is generated in response to detecting an event. The hardcoded alert image frame includes motion deltas and/or color changes with respect to an event image frame. A stream of encoded image frames is generated, in which stream the hardcoded alert image frame is inserted in display order after the encoded event image frame.

15 Claims, 4 Drawing Sheets

(56) References Cited

U.S. PATENT DOCUMENTS

| | | | |
|---|---|---|---|
| 2004/0027453 A1 | 2/2004 | Hasegawa et al. | |
| 2006/0092011 A1 | 5/2006 | Simon et al. | |
| 2007/0250920 A1* | 10/2007 | Lindsay | G06F 21/31 726/7 |
| 2007/0296817 A1* | 12/2007 | Ebrahimi | H04N 7/18 348/161 |
| 2008/0291279 A1* | 11/2008 | Samarasekera | G08B 13/19693 348/E7.086 |
| 2009/0288011 A1* | 11/2009 | Piran | G06F 3/048 715/720 |
| 2011/0051808 A1* | 3/2011 | Quast | H04N 7/18 375/E7.085 |
| 2014/0022087 A1 | 1/2014 | Lin et al. | |
| 2014/0036152 A1* | 2/2014 | Jackson | H04N 21/47 348/E5.099 |
| 2014/0037264 A1* | 2/2014 | Jackson | H04N 21/44008 386/E5.052 |
| 2015/0019981 A1* | 1/2015 | Petitt, Jr. | G06F 3/04842 715/738 |
| 2016/0220174 A1* | 8/2016 | Yip | G16H 40/67 |
| 2017/0134746 A1* | 5/2017 | Lawrence | H04N 19/527 |
| 2018/0190084 A1* | 7/2018 | Mandlakazi | G08B 7/06 |
| 2021/0092387 A1* | 3/2021 | Edpalm | H04N 19/167 |
| 2021/0176410 A1* | 6/2021 | Andersson | H04N 23/698 |
| 2022/0129680 A1* | 4/2022 | Edpalm | G08B 13/19663 |

FOREIGN PATENT DOCUMENTS

| | | |
|---|---|---|
| WO | 2005/050582 A2 | 6/2005 |
| WO | 2005/120071 A2 | 12/2005 |
| WO | 2006/006081 A2 | 1/2006 |

* cited by examiner

ALERT GENERATION BASED ON EVENT DETECTION IN A VIDEO FEED

FIELD OF INVENTION

The present invention relates to video surveillance systems, and more specifically to generating an alert to an operator in response to detecting an event in a video feed.

TECHNICAL BACKGROUND

In many surveillance systems, videos or other data from a large number of cameras and/or other sensors are managed and displayed on monitoring screens in an operation control room. Typically, there are several screens, such as 3-6 screens, in the operation control room. Each screen displays several video feeds, e.g., 4×4 video feeds, which are monitored by an operator. Consequently, the operator must pay attention to 48 (3×16) to 96 (6×16) video feeds simultaneously in order to be able to detect an event in a single video feed.

An event may be a movement of an object, such as a vehicle, an intruder in a restricted area, a detected face, a crowded area, just to give some examples. However, due to the large amount of video feeds there is a risk that the operator misses to detect the event in one of the video feeds, especially if the event is subtle or occurs very quickly, while the operator's attention may temporarily be directed away from the particular video feed that contains the event. Therefore, there is a need to direct the operator's attention to a certain video feed in case of an event in that video feed.

A video surveillance system is described in WO 2006/006081. The video surveillance system is composed of smart cameras, servers, and clients, connected through IP-networks in wired or wireless configurations. The system has been designed so as to protect the privacy of people and goods under surveillance. The operations of the smart cameras are optimized to provide a compromise in terms of perceived visual quality of the decoded video, versus the amount of power consumption. The servers receive, store, manage and dispatch the video sequences on wired and wireless channels to a variety of clients and users with different device capabilities, channel characteristics and preferences. Use of seamless scalable coding of video sequences prevents any need for transcoding operations at any point in the system.

US 2003/0122667 describes a system and method for enhancing security at a self-checkout station. The system includes security agent applications executing in the terminals of several self-checkout stations. The security agent software generates and transmits event messages regarding security events occurring at a station to a server. The server sends prioritized event messages as alert messages to a security controller. The security controller is coupled to security cameras, image data storage devices, and image data display devices and generates control messages for these devices in accordance with the alert messages received. The control messages for the security cameras operate the cameras to zoom, focus, tilt, or pan with respect to the events occurring at a station. The controller may insert visual alert indicators in the video stream of a camera directed to a monitor or an audible tone in the audio of the video stream to alert security personnel to the display of ongoing security events at a station.

SUMMARY

According to a first aspect, a method, in a camera system, for processing a stream of image frames comprises:

in response to detecting an event, generating a hardcoded alert image frame, wherein the hardcoded alert image frame is an inter-image frame and includes motion deltas and/or color changes with respect to an event image frame, and wherein the hardcoded alert image frame is generated in software to produce a desired change in a video stream when displayed to an operator; and generating a stream of encoded image frames, wherein the hardcoded alert image frame is inserted in the stream of encoded image frames in display order after the encoded event image frame.

This method makes it easier for an operator to get alerted about video feeds in a surveillance situation where suspicious events may occur. The method is not limited by the type and/or detection mechanism for the event, but can be applied to any type of event. An event image frame as used herein is an image frame that correlates with an event. The event image frame can be an image frame comprising the actual event, or an image frame that was captured at, or in close proximity to, the time of the event. Further, the expression hardcoded alert image frame when used in this disclosure should be understood as an alert image frame generated in software to produce a desired change in the video when displayed to an operator thereby alerting the operator of the event. Thus, it should be understood that the hardcoded alert image frame is not produced by an encoder by encoding image data. Since the alert image frame is hardcoded, it does not need to be encoded by the encoder, but can be inserted straight into the image stream output from the encoder. The desired change in the video when displayed to the operator may be a shaking movement and/or a color change in the displayed video in order to alert the operator. The type of alert, that is, "shaking" and/or color changes, is configurable, such that the most appropriate type of alert can be selected, given the circumstances at hand.

As understood by the skilled person in the art having knowledge about video encoding formats prescribing temporal video compression implemented in terms of intra-image frames and inter-image frames, an encoded inter-image frame comprises: 1) a reference to a reference frame, i.e., to an image frame that is to be used in inter prediction when the encoded inter-image frame is decoded by a decoder, 2) a frame number so the decoder can decode it in the right decoding order, and 3) an indication of a display order so the decoder can display the decoded inter-image frame at the correct temporal position in the decoded video stream. Thus, the skilled person would understand that the hardcoded alert image frame being an inter-image frame comprises: 1) a reference to the event image frame that is to be used when decoding the hardcoded alert image frame that comprises the motion deltas and/or color changes relative to the event image frame, 2) a frame number indicating in which decoding order the hardcoded alert image frame is to be decoded, and 3) an indication of a display order so the decoder can display the decoded hardcoded alert image frame in the right display order to produce the desired change in the video stream when displayed to the operator. Sometimes in this disclosure the hardcoded alert image frame is referred to as just alert image frame.

According to one embodiment, the method further comprises encoding the event image frame as a no-display frame. While it is possible to alert an operator without encoding the event image frame as a no-display frame, the visual effect is often more aesthetically pleasing if the event image frames are encoded as no-display image frames. Further, by encoding the event image frames as "no-display"

image frames and inserting the alert image frames after (i.e., in the display order even if the event image frames are no-display image frames and thus not to be displayed, the alert image frames should be inserted after them as if they were to be displayed) the respective event image frames, the original display framerate can be preserved, thus giving the video on the operator's display a natural appearance. "No-display" in this context means that the image frame is not to be displayed to a user. The H.265 encoding standard (and other newer encoding standards such as Google's VP10, for example), allow a frame to be tagged as "no-display." In H.265 for example, the tagging can be done by setting the pic_output_flag in the slice header to false or setting the no_display flag in the SEI header to true.

According to one embodiment, the event is either an event detected in an event image frame in a stream of image frames, or an external event. That is, as was mentioned above, the method is not limited to any specific type of event detection. For example, an event may be detected by analyzing, e.g., by means of the camera system, the content of the image frames, but it may also be triggered by an external sensor, such as a door being opened, and correlated with an event image frame that was captured at the time (or at close proximity to the time) the sensor was triggered. This greatly increases the situations in which the method in accordance with the invention can be used.

According to one embodiment, both generating steps are repeated for several event image frames. Even if the method described herein was only used for a single event image frame, it would still provide an improvement compared to existing techniques in terms of alerting an operator to an event. However, by repeating the generating steps of the method for several event image frames, it is possible to achieve a "shaking" or "flashing" appearance in the image stream, which will make it easier for the operator to be alerted that an event has occurred in a particular video feed. The shaking/flashing can go on for a certain, predetermined amount of time, or until the operator acknowledges the alert.

According to one embodiment, the motion deltas include motion relative to the event image frame in a horizontal direction, in a vertical direction, and any combination thereof. Most encoders are capable of applying both horizontal and vertical motion. Therefore, it should be understood that also the alert image frame, i.e., the hardcoded alert image frame, generated in software, e.g., by an image processing pipeline, may comprise motion deltas that include both horizontal and vertical motion. This makes it possible to move (and thereby "shake") the images in the image stream in essentially any pattern that a user desires. In some cases, these patterns may be correlated with a particular type of event too. For example, a suspicious person entering a scene may cause a "small vertical shaking," whereas if somebody is attempting to break into a building may cause a "bright red flashing," or similar.

According to one embodiment, the motion deltas have a configurable size or a pre-defined size. Being able to either select a pre-defined size or a configurable size of the motion increases the versatility of the invention and makes it adaptable to many varying use cases. For example, the size of the motion delta can be related to various features of the event, such as type, strength, importance, or accuracy, just to mention a few examples.

According to one embodiment, the motion deltas are applied only to a portion of the alert image frame. That is, in some cases, there may not be any need to apply motion to the entire alert image frame. For example, if an object in a scene is placed against a uniformly colored wall, there would be little or no point in "shaking" the entire wall, but it would be sufficient to only shake the object, thereby preserving computing resources while also allowing the operator to be alerted.

According to one embodiment, the color changes include one or more of: a more colorful representation relative to the event image frame, a less colorful representation relative to the event image frame, and a changing color representation relative to the event image frame. This allows any color configuration to take place in the alert image frames, and various effects can be created such as a more or less intense flashing, flashing with alternating colors, or converting the entire alert image frame to a uniform color.

According to one embodiment, the color changes are applied only to a portion of the alert image frame. Similar to what was described above, in some cases it may be sufficient to only apply color changes to particular objects of interest, which would highlight the object and leave the rest of the alert image frame unchanged. This could, for example, be useful in a face recognition scenario where, in a group of people, only a particular individual may be of interest to the operator. Further, the color changes do not necessarily need to be applied to the object, but a specific portion of the alert image frame could be colored, such as a border around the alert image frame, just to mention one example, or the alert image frame can be made striped or have some kind of other pattern, which may be particularly useful if a particular alert pattern is linked to a particular event type.

According to one embodiment, the method further comprises in response to an input from an operator, removing the no-display status of the event image frame and changing the status of the alert image frames to no-display, in order to enable the operator to view the event captured by the camera system. That is, after the operator has been alerted and acknowledged the alert, she can review the original images captured by the camera, to determine what the event was and whether any action needs to be taken.

According to one embodiment, the alert image frame is one of: a forward predicted frame (P-frame), containing motion deltas relative to the event image frame, and a bidirectional frame (B-frame), containing motion deltas relative to the event image frame. P-frames and B-frames are well known, standard concepts, in the context of image processing, thereby making it easy to integrate with the invention described herein with existing and future monitoring systems.

According to one embodiment, the hardcoded alert image frame is generated based on an alert image frame generated outside the camera system. Thus, the generating of the hardcoded alert image frame may comprise generating the hardcoded alert image frame based on an alert image frame generated outside the camera system. This reduces the required computing power of the camera and makes the invention applicable to a larger number of devices. For example, the alert image frame can be generated by an external application that neither has control over the camera image processing pipeline nor the Video Management System (VMS) event handling system. The external application can be triggered, for example, by an external device, such as a microphone, radar, Passive Infrared (PIR) sensor, motion sensor, door sensor, window sensor, etc. The alert image frame generated by the external application comprises motion deltas and/or color changes, such as predefined or predetermined motion deltas and/or color changes. Further, the alert image frame may be inputted to the image processing pipeline that may generate the hardcoded alert image frame based on the externally generated alert image frame.

Since the hardcoded alert image frame is generated with respect to the event image frame it should be understood that the image processing pipeline generates the hardcoded alert image frame as an inter-image frame comprising the motion deltas and/or color changes from the inputted alert image frame and a reference to the event image frame. As mentioned above and as known by those skilled in the art, an inter-image frame comprises also a frame number and an indication of a display order.

According to one embodiment the event image frame is a reference frame for a Group of Pictures (GOP). A GOP is a well-known, standard concept, in the context of image processing, thereby making it easy to integrate the invention described herein with existing and future monitoring systems.

According to a second aspect, the invention relates to a camera system. The camera system includes a lens, an image sensor, an image processing pipeline and an encoder. The lens and image sensor are configured to capture a stream of image frames. The image processing pipeline is configured to generate a hardcoded alert image frame in response to detecting an event, wherein the hardcoded alert image frame is an inter-image frame and includes motion deltas and/or color changes with respect to an event image frame, and wherein the hardcoded alert image frame is generated in software to produce a desired change in a video stream when displayed to an operator. The encoder is configured to generate a stream of encoded image frames, wherein the hardcoded alert image frame is inserted in the stream of encoded image frames in display order after the encoded event image frame.

The system advantages correspond to those of the method and may be varied similarly.

According to a third aspect, a computer program product for processing a stream of image frames captured by a camera system contains instructions corresponding to the steps of:
 in response to detecting an event, generating a hardcoded alert image frame, wherein the hardcoded alert image frame is an inter-image frame and includes motion deltas and/or color changes with respect to an event image frame, and wherein the hardcoded alert image frame is generated in software to produce a desired change in a video stream when displayed to an operator; and
 generating a stream of encoded image frames, wherein the hardcoded alert image frame is inserted after the encoded event image frame in the stream of encoded image frames The computer program involves advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
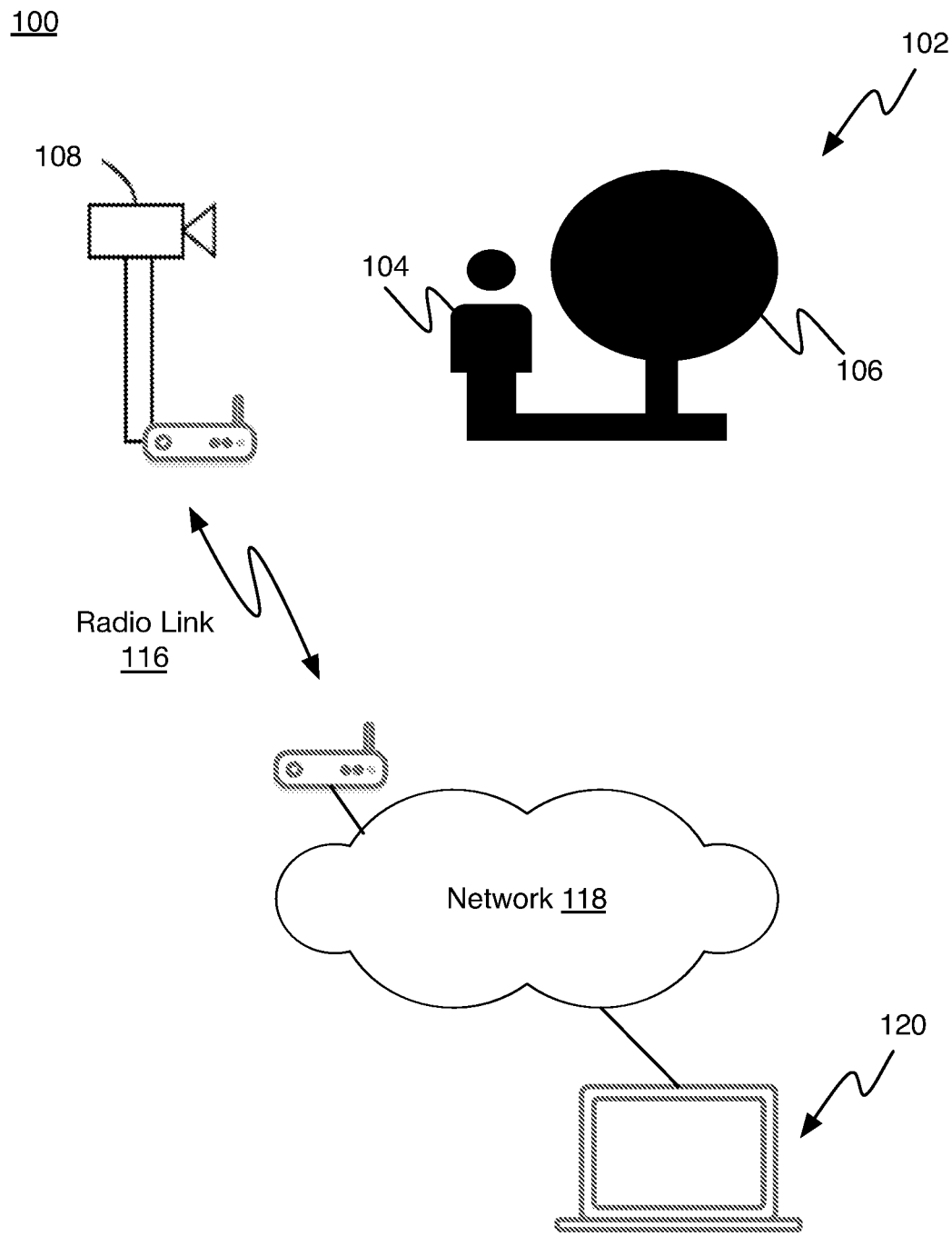
FIG. 1 is a schematic diagram showing an exemplary environment 100, in accordance with one embodiment, in which various methods and systems can be applied.

As was described above, one goal with the various embodiments is to provide improved techniques for directing an operator's attention to a certain video feed in case of an event in that video feed. Exactly what constitutes an "event" falls outside the scope of these embodiments, and may be separately determined. However, as mentioned in the introductory part of the specification, examples of events include a movement of an object, such as a vehicle, an intruder in a restricted area, a detected face, a crowded area, etc. These can all be thought of as "visual" events. However, there may also be events, such as sounds or something breaking or malfunctioning, which may not be visual, but can also be processed in accordance with the techniques described below. The various embodiments of this invention relate to what happens after an event is detected.

In accordance with the various embodiments described herein, when an event is detected and associated with an image frame, hereinafter referred to as an "event image frame" in a stream of image frames, an alert image frame is generated. The alert frame is similar to the image frame, but is different in that at least a portion of the alert frame either contains a motion with respect to the event image frame (i.e., one or more motion vectors are applied to at least a portion of the event image frame in generating the alert image frame), or contains a color change with respect to the event image frame (e.g., such that the alert image frame appears more red, say, compared to the event image frame). The alert image frame is hardcoded, meaning it is not encoded by the encoder. Further, the hardcoded alert image frame is generated in software, e.g., by an image processing pipeline (IPP). This may also be expressed as the hardcoded alert image frame is produced by software executed, e.g., in the IPP. Various combinations of motion and color changes in the alert image frames are also possible.

The alert image frame is inserted in the stream of image frames at the place of the event image frame. Thus, the hardcoded alert image frame may be inserted in the stream of encoded image frames at the location of the encoded event image frame. More specifically, in one embodiment, the alert image frame is inserted immediately after the event image frame. For example, the hardcoded alert image frame may be inserted in the stream of encoded image frames in display order after the encoded event image frame. In such embodiments, the alert image frame will be displayed after and in addition to the event image frame. In some embodiments, the event image frame is changed to "no display" meaning that the event image frame is not to be displayed. In such embodiments, the alert image frame will be displayed instead of the event image frame. This process may be repeated for several event image frames in the stream of image frames and with different motion and/or different color changes (e.g., different intensities) applied to the alert image frames, often for several seconds. As a result, the video feed on the operator's display appears to "shake" and/or "flash," which increases the likelihood that the operator will detect an event that otherwise might go undetected. Further, the stream of image frames can be changed after the operator has acknowledged the event, such that the alert image frames are removed and the no-display status is removed from the event image frames, which allows the operator to examine the event that was captured by the camera. Various embodiments of the invention will now be described by way of example and with reference to the drawings.

System Overview

FIG. 1 shows a schematic diagram of an exemplary environment 100 in which various embodiments can be implemented. As can be seen in FIG. 1, a scene 102 with a person 104 and a tree 106 is captured by a camera system 108. It should be noted that the depiction of the scene 102 is merely a simplistic view for illustrative purposes. A scene 102 can be described, in a more general sense as any three-dimensional physical space whose size and shape are defined by the field of view of a camera recording the scene.

Figure 3:
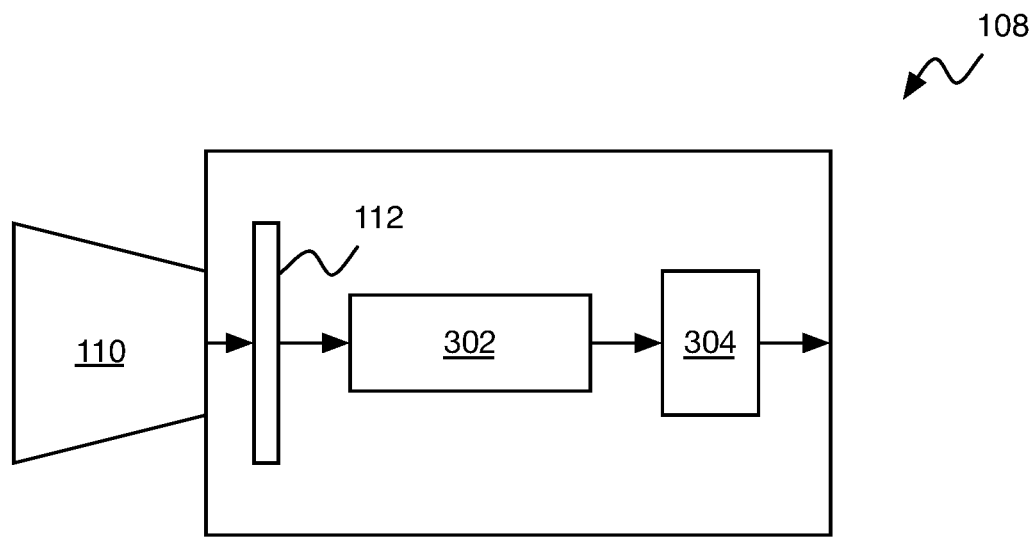
FIG. 3 is a block diagram showing a detailed view of the camera system 108 illustrated in FIG. 1, in accordance with one embodiment.

The camera system 108, which is illustrated in more detail in FIG. 3, has a lens 110 that captures the scene 102 and projects it onto an image sensor 112. The image sensor 112 captures a series of image frames, which together form a video stream. The image sensor is coupled to an image processing pipeline 302 and an encoder 304, both of which will be described in further detail below. The image processing pipeline 302 and encoder 304 are preferably located inside the camera system 108, but could also be external to the camera system. In for example a modular camera system, the lens 110 and the image sensor 112 may be comprised in an image capturing module, and the image processing pipeline 302 and the encoder 304 may be comprised in an image processing and encoding module. The image capturing module and the image processing and encoding module may be arranged separately from each other and arranged in communication with each other over a wireless or wired connection. Further, the image capturing module may be movable while the image processing and encoding module may be stationary. The image processing pipeline 302 takes the signal from the image sensor 112 and performs various types of image processing operations, before encoding the video stream into a format that is suitable for transmission over a network to an operator. In FIG. 1, the encoded video is transmitted wirelessly over a radio link 116 to a wired network 118, and eventually to a client 120, which is connected to the network 118, but of course there are many combinations of wireless and wired transmission models that can be used.

The client 120 has a display where an operator can view the image video stream from the camera. Typically, the client 120 is also connected to a server, where the video can be stored and/or processed further. Often, the client 120 is also used to control the camera 108, for example, by the operator issuing control commands at the client 120. For example, an operator may instruct the camera to zoom in on a particular detail of the scene 102, or to track the person 104 if she starts to move away from the tree 106. However, there are also situations in which an operator does not control the camera, but the camera is stationary and merely provides the image stream for the operator to view on the client 120.

Figure 2:
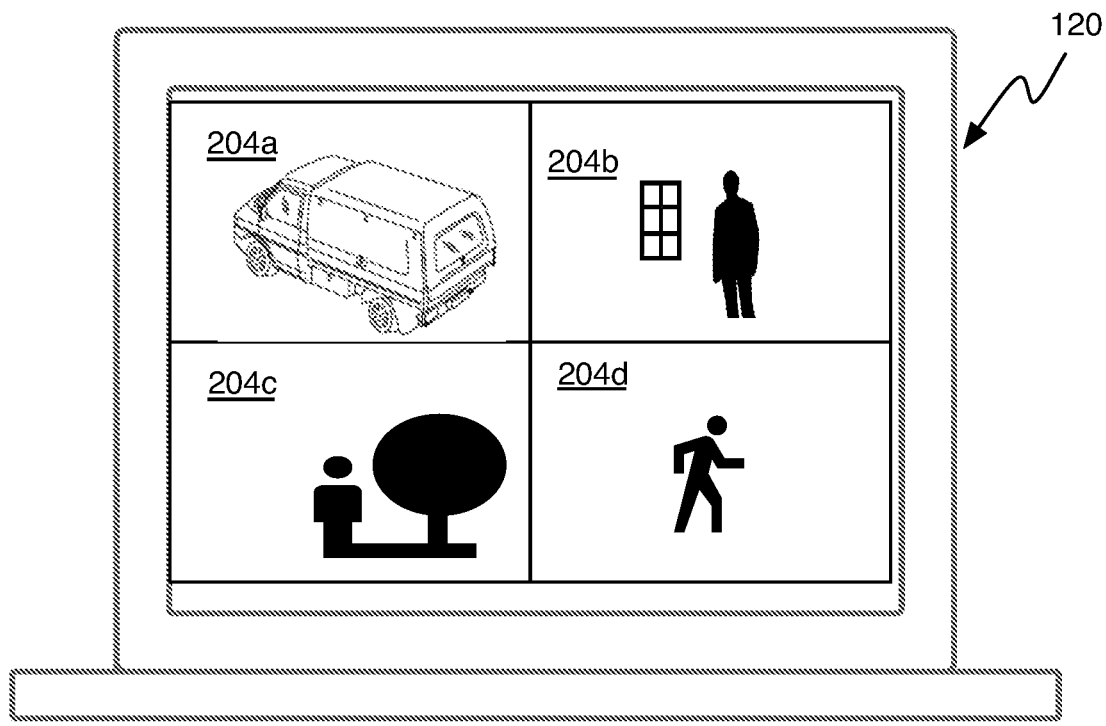
FIG. 2 is a schematic illustration of a display showing four video feeds, in accordance with one embodiment.

FIG. 2 shows a schematic view of what an operator may see on the display of her client 120. As can be seen in FIG. 2, the display is divided into four sections 204*a-d*, each of which shows a video feed from a separate camera. For ease of illustration, only four separate feeds are shown in FIG. 2, although it should be noted that often there may be 9, 16 or even more feeds on a single display. A scene depicting a car is shown in section 204*a*, a scene depicting a person looking through a window is shown in section 204*b*, the scene 102 of FIG. 1 is shown in section 204*c*, and a person running past the camera is shown in section 204*d*. As was explained above, the operator, who is typically watching several displays, each of which has multiple sections, might easily miss subtle or short-duration events occurring in one of the sections, for example, of the person in section 204*b* moved a little close to the window. This is particularly true if the operator's attention might have been focused on a different display, while the event occurred. Before specifically describing how the various embodiments of the invention address this problem, a brief description of camera components an image processing will be provided.

As shown in FIG. 3, the camera system 108 includes a lens 110 imaging the scene 102 on an image sensor 112. After performing various operations, typically filtering, demosaicing and color correction, the resulting image is forwarded to an image processing pipeline (IPP) 302. It should be noted that in some embodiments, the color correction may be done in the IPP 302.

In the IPP 302, further processing is performed on the image. Such further processing may include noise filtering (for eliminating spatial and/or temporal noise), distortion correction (for eliminating effects of e.g., barrel distortion), global and/or local tone mapping (e.g., enabling imaging of scenes containing a wide range of intensities), transformation (e.g., rotation), flat-field correction (e.g., for removal of the effects of vignetting), application of overlays (e.g., privacy masks, explanatory text, etc.). The IPP 302 may also be associated with an analytics engine (not shown), performing object detection, object recognition, alarms, etc. The IPP 302 may also be configured to generate the hardcoded alert image frame comprising the motion deltas and/or color changes relative the event image frame. As previously mentioned, the hardcoded alert image frame may be generated in software by the IPP 302. Thus, the IPP 302 may execute computer program code instructions to generate the hardcoded alert image frame. Further, the IPP 302 may be configured to generate the hardcoded alert image frame as an inter-image frame comprising motion deltas and/or color changes relative the event image frame. As known to a skilled person in the art, an inter-image frame comprises a reference to a reference frame that is to be used when decoding the inter-image frame, a frame number indicating a decoding order of the inter-image frame to be used by a decoder to decode the inter-image frame in the correct decoding order, and an indication of a display order to be used by the decoder to display the inter-image frame in the correct display order. Thus, the IPP 302 generates the hardcoded alert image frame to comprise a reference to the event image frame, a frame number and an indication of a display order.

Following the image IPP 302, the image, i.e., the image to be encoded by an encoder, may be forwarded to an encoder 304, in which the information is coded according to an encoding protocol and forwarded to the receiving client 120 over the network 118. Further, as will be described below, the hardcoded alert image frame generated in software, e.g., by the IPP 302, will be forwarded to the encoder 304 in order to be inserted in the stream of image frames encoded by the encoder 304. It should be noted that the camera system 108 illustrated in FIG. 3 also includes numerous other components, such as processors, memories, etc., which are common in conventional camera systems and whose purpose and operations are well known to those having ordinary skill in the art. Such components have been omitted from the illustration and description of FIG. 3 for clarity reasons. There are a number of conventional video encoding formats. Some common video encoding formats that work with the various embodiments of the present invention include: High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples. These video encoding formats prescribe temporal video compression implemented in terms of intra-image frames and inter-image frame. The intra-image frames may also be referred to as intra-frames, I-image frames or I-frames, and the inter-image frames may also be referred to as inter-frames and may be predictive, e.g., forward predictive, image frames so called P-frames or bidirectional predictive image frames so called B-frames. An I-image frame can be described as an image frame that is encoded using only the information in the image frame to be encoded. Moreover, the I-frame is calculated from all image data captured for the image frame to be encoded. Therefore, the I-frame sometimes is also referred to as a full image frame.

The P-frames may be based on information from previously encoded image frames as well as the information of the presently encoded image frame. The B-frames may be based on information from previously and optionally later encoded image frames as well as the information of the presently encoded image frame. That is, an inter-image frame may be described as taking advantage of temporally redundant information in previous (and optionally later) image frames. An encoder implementing this type of codec (compression standard) typically generates an I-image frame followed by a predetermined number of inter-image frames, e.g., P- and/or B-frames, and then a new I-image frame followed by the same number of inter-image frames. The length of this sequence of an I-frame followed by a number of inter-image frames is often referred to as a Group of Pictures (GOP) length. For some compression standards, such as H.265, the GOP-length can be adjusted during encoding.

Figure 4:
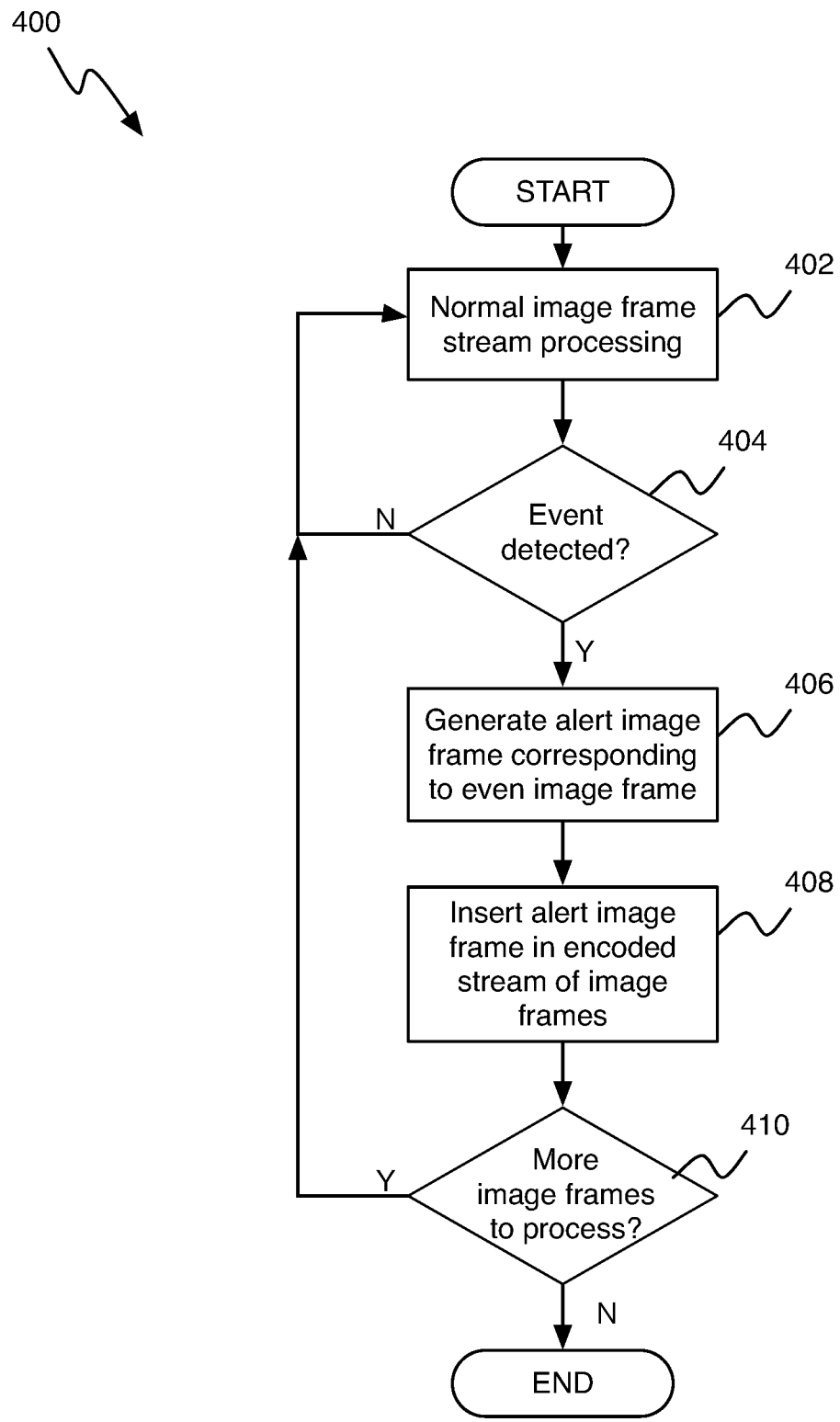
FIG. 4 is a flowchart showing a method for processing a stream of image frames, in accordance with one embodiment.

FIG. 4 shows a method for processing a stream of image frames captured by a camera, in accordance with one embodiment. As can be seen in FIG. 4, the method starts by processing a stream of image frames in a conventional fashion as described above with reference to FIG. 3, step 402. During the normal processing in step 402, there is a continuous monitoring to detect whether an event has occurred, step 404. As was mentioned above, the event detection itself is separate from the scope of invention. However, the event detection can always be correlated with one or more event image frames. For example, in one embodiment, an event can be detected by analyzing the content of the image frames captured by the camera system 108. In another embodiment, an event can be correlated with an image frame based on time. For example, by knowing at what time a sensor was triggered (e.g., by a door or window being opened), it is possible to determine which image frame(s) was captured at that exact time. Irrespective of how the event was detected, it will always correspond to one or more image frames, which will be referred to herein as event image frames. It should be noted that an event image frame does not necessarily need to be the image frame that was captured at the exact time the event occurred, but the event could instead be associated with an event image frame that is captured within a certain time frame after the event occurred. For clarity purposes, the examples described herein will generally refer to a single event image frame, but it should be realized that these techniques are applicable to several event image frames, which may be consecutive or non-consecutive and which may be captured for the entire duration of an event or only part of the duration of the event. If no event has occurred, the normal processing continues. However, if it is discovered in step 404 that an event has occurred, an alert image frame is generated, step 406. The alert image frame corresponds to the event image frame but has a few differing features, as will now be described.

In one embodiment, the alert image frame is a P-frame with a predefined leftward or rightward motion relative to at least a part of the event image frame. Typically, this motion is implemented using motion vectors, as is well known to those having ordinary skill in the art. Both the amount of motion and the direction of the motion can be configurable or be predefined, depending on the particular implementation. For example, the encoder 304 may support both horizontal and vertical movement, which also enables any kind of diagonal movement. As previously mentioned, the hardcoded alert image frame is produced in software, e.g., by the IPP 302. However, for a decoder decoding the hardcoded alert image frame it should "look" as if it was encoded by the encoder 304. Thus, for the decoder there is no difference between image frames encoded by the encoder 304 and the hardcoded alert image frame generated in software, e.g., by the IPP 302. Therefore, also the hardcoded alert image frame may comprise motion deltas relative the event image which motion deltas provide both horizontal and vertical motion. In a scenario where there are several event image frames, which is common, the corresponding alert image frames can be generated such that they include movement in alternating directions. This will be described in further detail below, but in essence, having an image stream where alternating alert image frames include alternating motion makes it possible to achieve a "shaking" effect when displayed on the display 120, which may help attract the operator's attention. It should be noted that the motion vectors can be global motion vectors, such that the entire alert image frame moves a certain amount and in a certain direction compared to the event image frame. Alternatively, the motion vectors can be applied to only a part of the event image frame, for example, a particular object of interest, such that only that part of the alert image frame moves relative to the event image frame.

Figure 5:
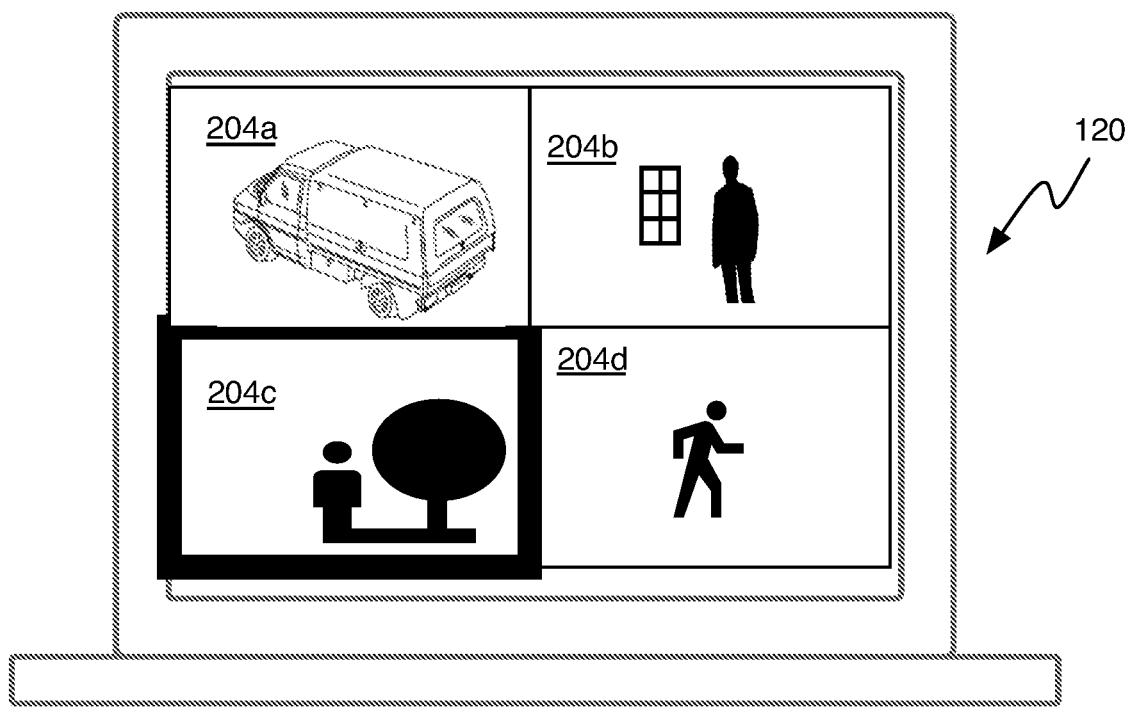
FIG. 5 is a schematic illustration of a display showing four video feeds in which one video feed is modified to attract the operator's attention, in accordance with one embodiment.

In another embodiment, the alert image frame is a P-frame with a predefined color change relative to at least a part of the event image frame. For example, the alert image frame can have a more or less colorful representation (e.g., more or less red) relative to the event frame. Of course, the color does not need to be the same in different alert image frames. For example, one alert image frame could have a more red tint, whereas a subsequent alert image frame could have a more blue tint. However, given how people are used to perceive red as "danger" or "alert", having red color with different intensities in the alert image frames may generally be a good choice. Similar to the motion vectors, the color change can be applied to the entire alert image frame or to a portion of the alert image frame. Also, the portion of the image frame does not necessarily have to relate to the content of the event image frame but could, for example, be a border around the alert image frame that is highlighted. Such an example is shown in FIG. 5, where an event has occurred in section 204c of the display 120.

Once the alert image frame, i.e., the hardcoded alert image frame, has been generated, it is inserted after—typically right after—the event image frame in the encoded stream of image frames and the corresponding event image frame is marked as a no-display image frame, step 408. By essentially "substituting" the event image frame with an alert image frame, the original framerate can still be kept and the content in the image stream will still have a normal appearance to the operator, apart from the shaking and/or color changes. Further, when the operator has acknowledged the event, the alert image frames can be removed and the no-display feature of the event image frames can also be removed, enabling the operator to determine whether the event that triggered the alert needs any attention.

It should be noted that since an event typically has a certain duration, there may be many event image frames associated with the event. In some embodiments, an alert image frame is generated for each event image frame, whereas in other embodiments alert image frames are only generated for a portion of the event image frames. Exactly how many event image frames should be used to generate alert image frames can be determined by a person having ordinary skill in the art, based on the situation at hand. As a general guideline, though, it is recommended that irrespective of how many alert image frames are generated, they contain movement in alternating directions and/or color intensity changes of varying degrees, as this will make the changes more noticeable to the operator. Further, the way in which the event image frames are selected makes it possible to configure various shaking patterns. For example, there may be three "gentle short-duration shakes", then pause the shaking for some time and display the event image frames, followed by a "large long-duration shake". In many ways, this is analogous to what can be done on cell phones in a vibrating mode.

In some embodiments, the "shaking" can proceed after the event has terminated, and until the operator acknowledges the event. For example, there are situations in which an event is very short and if the shaking only occurred during the event, the operator might still miss it. Therefore, in order to increase the likelihood of the operator detecting the event, the system can continue generating alert image frames until the operator acknowledges the event. This can be implemented, for example, by setting a number of "normal" image frames following the event frame to also be "no-display" and then add a corresponding number of generated alert frames to the stream.

Once the stream of image frames that contains the alert image frames has been generated, it is determined whether there are any more image frames to process, step 410. If so, the normal image processing resumes in step 402, as described above. If there are no more image frames to process, for example, if the camera is turned off or goes to sleep, the method 400 ends.

To further illustrate the versatility of the embodiments as described herein, consider the following example.

An event triggers.

The system has been configured to alert the operator by means of a flashing red alert, which repeats in the form 0%-100% red mixed in with the original image, for example, 0% for event image frame #1, 50% for event image frame #2, 100% for event image frame #3, 50% for event image frame #4, 0% for event image frame #5, 50% for event image frame #6, etc.

For some event image frames, specifically event image frames #2, #3, #4, #6, etc., alert image frames are generated and added to the stream of image frames, and the event image frames #2, #3, #4, #6, etc. are marked as "no-display." However, for event image frames #1, #5, etc. (i.e., the alert image frames with 0% mix would be identical to the corresponding event image frames), no alert image frames need to be generated (and there also would be no need to mark these image frames as "no-display" image frames).

In the above example, the event images frame #1 and #5 will be normally encoded and the event image frames #2, #3, #4, and #6 will be encoded as no-display by the encoder 304. A first hardcoded alert image frame A1 will be generated in software, e.g., by the IPP 302, with 50% red mixed in with respect to the event image frame #2 and it will be inserted, by the encoder 304, in the stream of encoded image frames in display order after the event image frame #2. Also, a second hardcoded alert image frame A2 will be generated, by the IPP 302, with 100% red mixed in with respect to the event image frame #3 and it will be inserted, by the encoder 304, in the stream of encoded image frames in display order after the event image frame #3. Further, a third hardcoded alert image frame A3 will be generated in software, e.g., by the IPP 302, with 50% red mixed in with respect to the event image frame #4 and it will be inserted, by the encoder 304, in the stream of encoded image frames in display order after the event image frame #4. In correspondence, a fourth hardcoded alert image frame A4 will be generated in software, e.g., by the IPP 302, with 50% red mixed in with respect to the event image frame #6 and it will be inserted, by the encoder 304, in the stream of encoded image frames in display order after the event image frame #6. Thus, the stream of image frames will in display order comprise the following image frames: the event image frame #1, the event image frame #2 (no-display), the first hardcoded alert image frame A1 (50% red relative #2), the event image frame #3 (no-display), the second hardcoded alert image frame A2 (100% red relative #3), the event image frame #4 (no-display), the third hardcoded alert image frame A3 (50% red relative #4), the event image frame #5, the event image frame #6 (no display), and the fourth hardcoded alert image frame A4 (50% red relative #6). As understood by a person skilled in the art, the insertion of image frames in the stream of image frames may require updating of one or more of the image frames' frame number, possible reference to one or more reference frames and indication of the display order in order to secure correct decoding of the image frame and the correct decoding order, and to secure the correct display order when displaying the stream of image frames.

As can be seen from this example, it is not necessary to generate alert image frames for every event image frame in a stream of image frames, but it may be sufficient to generate alert image frames only for a subset of the event image frames.

In one embodiment, there may be two separate "tracks," one that contains the original stream of image frames, and one that only contains alert image frames. If the first track is set to "no-display," only the stream of alert image frames would be displayed to the operator. As a result, the operator's attention would be captured by a "shaking still image" shown in the second track and then the operator can switch over to the first track and remove the no-display feature, to view what was actually captured by the camera.

It should be noted that while the examples above are focused on using P-frames, the same general principles are applicable to B-frames, which can refer both forwards and backwards in the GOP. However, B-frames typically have higher memory requirements compared to P-frames, so in most cases using P-frames would be preferable.

Further, while the above examples have been described as discrete embodiments where either movement or color change occurs in the alert image frames, there is nothing that would prevent these embodiments from being combined. For example, a shaking and flashing effect could be created, which may even further increase the likelihood of the operator quickly noticing the video feed containing the event. In some embodiments, other effects may be applied. For example, twisting or "warping" of an image could occur as an alternative to (or in combination with) the shaking and flashing. Further, in some implementations, the type of alert may change if the alert is not acknowledged by the operator for a certain amount of time. For example, if a "shaking" alert is not acknowledged, it may change to a flashing alert, etc.

It should also be noted that in some implementations, there may be various types audible alerts (warning sounds or alarms, etc.) associated with the visual alerts displayed on the display.

The systems (e.g., image processing pipeline and/or encoder) and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages as shown in the embodiments above. Thus, the concepts herein should not be limited to the shown embodiments but should only be defined by the appended claims. Additionally, as the skilled person understands, the shown embodiments may be combined.

The invention claimed is:

1. A method in a camera system for processing and transmitting a stream of image frames, comprising:
   in response to detecting an event and by means of an image processing pipeline, IPP, generating a hardcoded alert image frame, wherein the hardcoded alert image frame includes motion deltas and/or color changes with respect to an event image frame of the stream of image frames, and wherein the hardcoded alert image frame is generated in software to produce a desired change in a video stream when displayed to an operator thereby alerting the operator of the event;
   by means of an encoder, generating a stream of encoded image frames based on the stream of image frames, the stream of encoded image frames including an encoded event image frame; and inserting the hardcoded alert image frame generated by the IPP in the stream of encoded image frames in display order after the encoded event image frame, wherein the hardcoded alert image frame is an inter-image frame with reference to the encoded event image frame; and
   transmitting the stream of encoded image frames from the camera system to a client for display thereon of a decoded version of the stream of encoded image frames.

2. The method of claim 1, further comprising:
   encoding the event image frame as a no-display image frame.

3. The method of claim 1, wherein the event is either an event detected in an event image frame in a stream of image frames, or an external event.

4. The method of claim 1, wherein the motion deltas include motion relative to the event image frame in a horizontal direction, in a vertical direction, and any combination thereof.

5. The method of claim 1, wherein the motion deltas have a configurable size or a pre-defined size.

6. The method of claim 1, wherein the motion deltas are applied only to a portion of the alert image frame.

7. The method of claim 1, wherein the color changes include one or more of: a more colorful representation relative to the event image frame, a less colorful representation relative to the event image frame, and a changing color representation relative to the event image frame.

8. The method of claim 1, wherein the color changes are applied only to a portion of the alert image frame.

9. The method of claim 2, further comprising:
   in response to an input from an operator, removing the no-display status of the event image frame and changing the status of the alert image frames to no-display, in order to enable the operator to view the event captured by the camera system (108).

10. The method of claim 1, wherein the alert image frame is one of:
    a forward predicted frame, P-frame, containing motion deltas relative to the event image frame and a bidirectional frame, B-frame, containing motion deltas relative to the event image frame.

11. The method of claim 1, wherein the generating of the hardcoded alert image frame comprises:
generating the hardcoded alert image frame based on an alert image frame generated outside the camera system.

12. The method of claim 1, wherein the event image frame is a reference frame for a Group of Pictures, GOP.

13. A camera system, comprising:
a lens and an image sensor configured to capture a stream of image frames;
an image processing pipeline, IPP, configured to:
in response to detecting an event, generate a hardcoded alert image frame, wherein the hardcoded alert image frame includes motion deltas and/or color changes with respect to an event image frame of the stream of image frames, and wherein the hardcoded alert image frame is generated in software to produce a desired change in a video stream when displayed to an operator thereby alerting the operator of the event; and
an encoder configured to:
generate a stream of encoded image frames based on the stream of image frames, the stream of encoded image frames including an encoded event image frame; and
insert the hardcoded alert image frame generated by the IPP in the stream of encoded image frames in display after the encoded event image frame, wherein the hardcoded alert image frame is an inter-image frame with reference to the encoded event image frame; and wherein the camera system is configured to transmit the stream of encoded image frames from the camera system to a client for display thereon of a decoded version of the stream of encoded image frames.

14. A non-transitory computer readable storage medium having program instructions embodied therewith, the program instructions being executable by a processor to perform a method comprising:
in response to detecting an event, generating a hardcoded alert image frame, wherein the hardcoded alert image frame includes motion deltas and/or color changes with respect to an event image frame of the stream of image frames, and wherein the hardcoded alert image frame is generated in software to produce a desired change in a video stream when displayed to an operator thereby alerting the operator of the event;
generating a stream of encoded image frames based on the stream of image frames, the stream of encoded image frames including an encoded event image frame; and
inserting the hardcoded alert image frame is inserted in the stream of encoded image frames in display order after the encoded event image frame, wherein the hardcoded alert image frame is an inter-image frame with reference to the encoded event image frame; and
transmitting the stream of encoded image frames to a client for display thereon of a decoded version of the encoded image frames.

15. The method of claim 1, wherein the motion deltas and/or color changes are predetermined.

* * * * *